(12) United States Patent
Goutal et al.

(10) Patent No.: US 11,252,176 B2
(45) Date of Patent: *Feb. 15, 2022

(54) OPTIMAL SCANNING PARAMETERS COMPUTATION METHODS, DEVICES AND SYSTEMS FOR MALICIOUS URL DETECTION

(71) Applicant: Vade Secure Inc., San Francisco, CA (US)

(72) Inventors: Sebastien Goutal, San Francisco, CA (US); Maxime Marc Meyer, Montreal (CA)

(73) Assignee: VADE SECURE INC., San Francisco, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/862,250

(22) Filed: Apr. 29, 2020

(65) Prior Publication Data
US 2021/0112089 A1 Apr. 15, 2021

Related U.S. Application Data

(63) Continuation of application No. 16/368,537, filed on Mar. 28, 2019, now Pat. No. 10,686,826.

(51) Int. Cl.
*H04L 29/06* (2006.01)
*G06K 9/62* (2006.01)
*G06F 40/263* (2020.01)

(52) U.S. Cl.
CPC ........ *H04L 63/1433* (2013.01); *G06F 40/263* (2020.01); *G06K 9/6263* (2013.01); *H04L 63/1483* (2013.01)

(58) Field of Classification Search
None
See application file for complete search history.

(56) References Cited

U.S. PATENT DOCUMENTS 7,809,796 B1 * 10/2010 Bloch .................. G06Q 10/107
709/206
9,344,449 B2 * 5/2016 Brown ................ H04L 63/1483
(Continued)

FOREIGN PATENT DOCUMENTS

WO WO-2012094040 A1 * 7/2012 ............. H04L 51/12

*Primary Examiner* — Michael Pyzocha
(74) *Attorney, Agent, or Firm* — Young Law Firm, P.C.

(57) ABSTRACT

A computer-implemented method may comprise collecting and storing a plurality of electronic messages and a corresponding plurality of phishing kits, each of which being associated with one or several malicious Uniform Resource Locator (URL) and extracting a set of features from each of the plurality of electronic messages. For each of the extracted set of features, the method may comprise determining a set of optimal scanning parameters using one or more decision trees, trained with a supervised learning algorithm based on programmatically or manually examining or reverse-engineering the source code of the phishing kits, or trained with a supervised learning algorithm based on a function that iteratively requests data from the websites pointed to by the malicious URLs and examines data and codes returned by such requests. These optimal scanning parameters may then be used to scan a malicious URL with a reduced likelihood that a defensive action will be taken to hide the existence of the malicious content pointed to by the malicious URL.

21 Claims, 16 Drawing Sheets

(56) References Cited

U.S. PATENT DOCUMENTS

| | | | | |
|---|---|---|---|---|
| 9,398,047 B2* | 7/2016 | Goutal | ................... | G06N 20/10 |
| 9,602,660 B2* | 3/2017 | Velthuis | .................. | H04L 51/12 |
| 9,769,194 B2* | 9/2017 | Iverson | ............... | H04L 63/1441 |
| 10,142,366 B2* | 11/2018 | Goutal | ................... | H04L 67/02 |
| 10,601,865 B1* | 3/2020 | Mesdaq | ................. | H04L 51/12 |
| 10,958,683 B2* | 3/2021 | Govardhan | ............ | G06F 16/951 |
| 2007/0136806 A1* | 6/2007 | Berman | ............... | G06Q 10/107 |
| | | | | 726/22 |
| 2011/0314546 A1* | 12/2011 | Aziz | ..................... | G06F 21/562 |
| | | | | 726/24 |
| 2014/0173726 A1* | 6/2014 | Varenhorst | ............ | H04L 63/101 |
| | | | | 726/22 |
| 2014/0181216 A1* | 6/2014 | Liebmann | ................ | H04L 51/12 |
| | | | | 709/206 |
| 2018/0375877 A1* | 12/2018 | Jakobsson | ............. | G06F 16/955 |
| 2019/0020625 A1* | 1/2019 | Wood | ................... | H04L 61/2069 |
| 2019/0199745 A1* | 6/2019 | Jakobsson | ........... | H04L 63/1433 |
| 2019/0334947 A1* | 10/2019 | Govardhan | ............ | G06F 16/951 |
| 2020/0014721 A1* | 1/2020 | Boulton | .............. | H04L 63/1483 |
| 2020/0036751 A1* | 1/2020 | Kohavi | ............... | H04L 63/1425 |
| 2020/0252428 A1* | 8/2020 | Gardezi | ............. | H04L 63/1416 |

* cited by examiner

FIG. 1

```
if(strpos($_SERVER['HTTP_USER_AGENT'], 'google') or strpos($_SERVER['HTTP_USER_AGENT'], 'msnbot') or
strpos($_SERVER['HTTP_USER_AGENT'], 'Yahoo! Slurp') or strpos($_SERVER['HTTP_USER_AGENT'], 'YahooSeeker') or
strpos($_SERVER['HTTP_USER_AGENT'], 'Googlebot') or strpos($_SERVER['HTTP_USER_AGENT'], 'bingbot') or
strpos($_SERVER['HTTP_USER_AGENT'], 'crawler') or strpos($_SERVER['HTTP_USER_AGENT'], 'PycURL') or
strpos($_SERVER['HTTP_USER_AGENT'], 'facebookexternalhit') !== false) { header('HTTP/1.0 404 Not Found'); exit; }
```

*FIG. 2*

```
RewriteEngine On
RewriteCond %{REMOTE_ADDR} ^82.20.255.107$
RewriteRule .* https://www.paypal.com [R,L]
RewriteCond %{REMOTE_ADDR} ^76.14.85.24$
RewriteRule .* https://www.paypal.com [R,L]
RewriteCond %{REMOTE_ADDR} ^93.40.130.78$
RewriteRule .* https://www.paypal.com [R,L]
RewriteCond %{REMOTE_ADDR} ^2.121.190.252$
RewriteRule .* https://www.paypal.com [R,L]
RewriteCond %{REMOTE_ADDR} ^23.242.68.213$
```

*FIG. 3*

```
Order deny,allow
Deny from all

Allow from .wanadoo.fr
Allow from .sfr.net
Allow from .proxad.net
Allow from .numericable.fr
Allow from .club-internet.fr
Allow from .bbox.fr
Allow from .completel.net
Allow from .bouyguesbox.fr
Allow from .completel.net
Allow from reverse.completel.net
Allow from .nordnet.fr
```

*FIG. 4*

```
$ip_data = @json_decode(file_get_contents("http://www.geoplugin.net/json.gp?ip=",$ip));

if($ip_data && $ip_data->geoplugin_countryName != null)
{
    $result = $ip_data->geoplugin_countryName;
}
```

FIG. 6

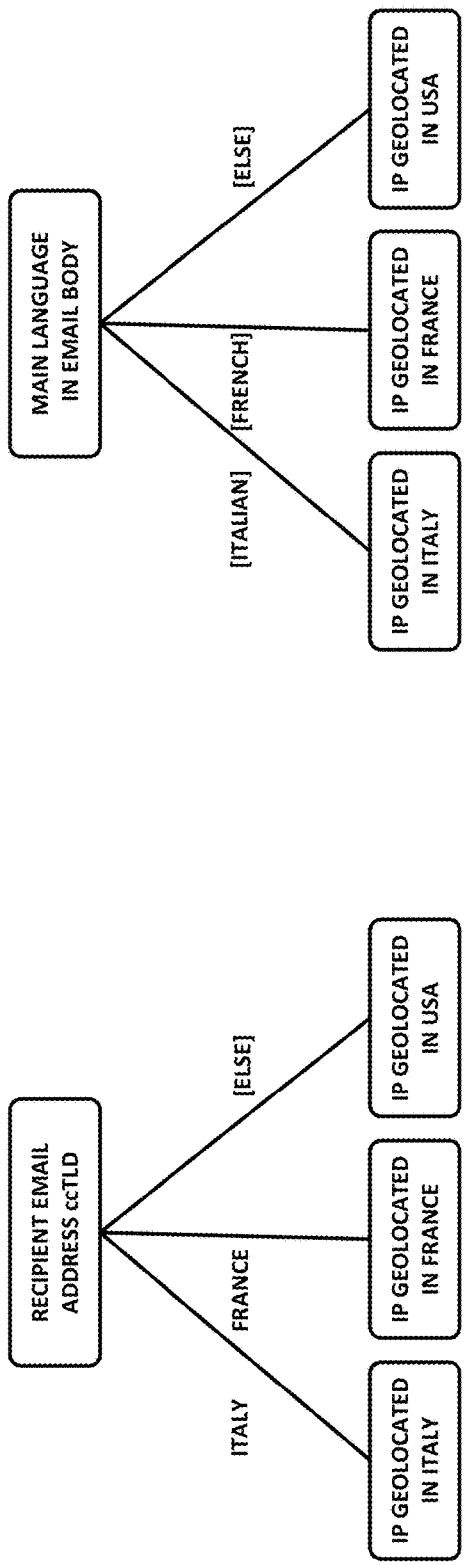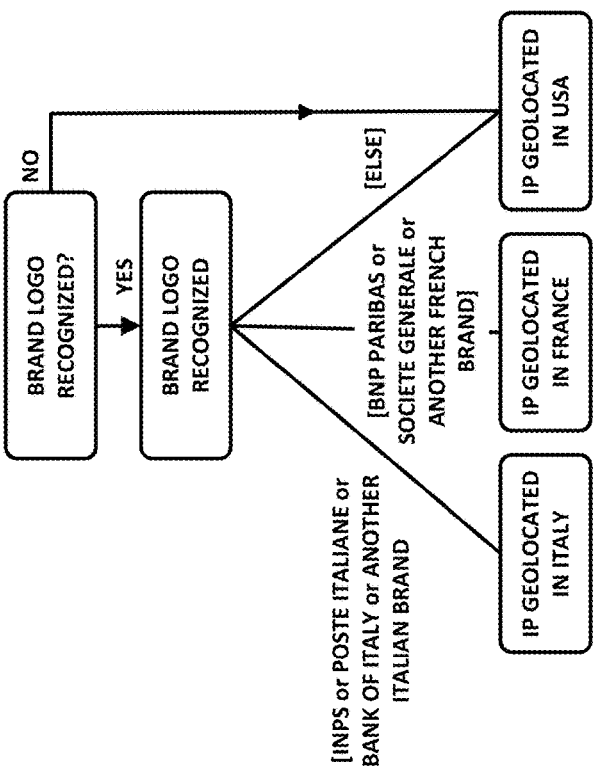
FIG. 8A
FIG. 8B
FIG. 8C

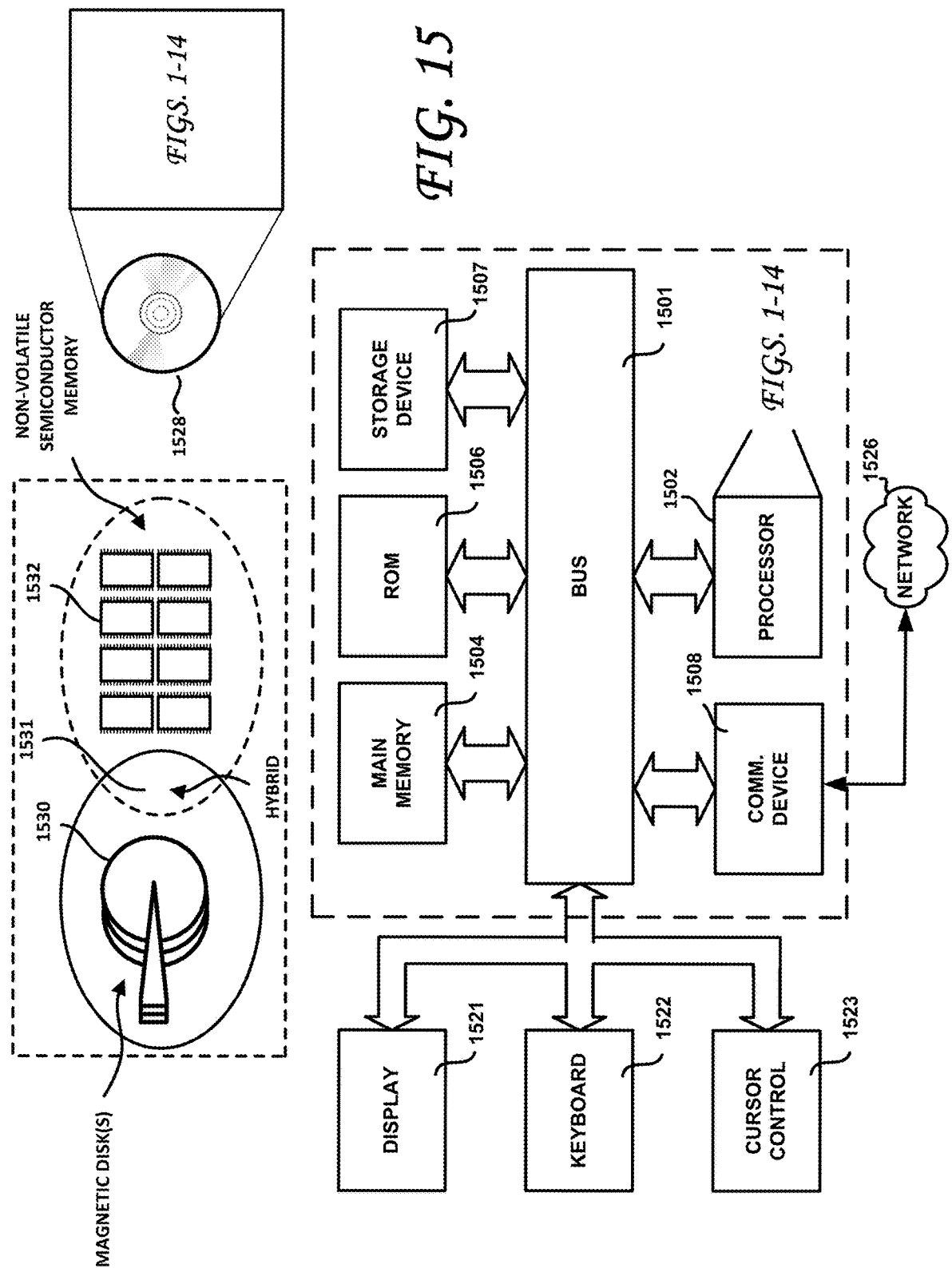

OPTIMAL SCANNING PARAMETERS COMPUTATION METHODS, DEVICES AND SYSTEMS FOR MALICIOUS URL DETECTION

BACKGROUND

It is common practice for cybercriminals to prey on their victims by sending them malicious electronic messages such as emails, text messages (SMS, MMS . . . ) or instant messages (WhatsApp, WeChat, Line, Telegram . . . ). Such cyberthreats, which may employ phishing, ransomware or cryptominers, for example, often contain Uniform Resource Locators (URLs) embedded in the electronic messages. Responsive to such threats, security vendors have developed URL scanning technologies to detect and block malicious URLs, using a wide range of algorithms and technologies such as machine learning, text mining, sandboxing and/or computer vision techniques. Such URL scanning technologies have been quite successful in detecting these online cyberthreats. As a result, the cybercriminals' bottom lines have been negatively impacted. To protect their illicit revenue stream, cybercriminals responded by implementing mechanisms to identify and block these security vendors scanners.

BRIEF DESCRIPTION OF THE DRAWINGS

FIG. 1 is an example of PHP code found in a phishing kit that returns an HTTP 404 error code to suspect IP ranges.

FIG. 2 is an example of PHP code that returns an HTTP 404 error code to banned User-Agent headers.

FIG. 3 shows an extract of a .htaccess file found in another phishing kit.

FIG. 4 is an example of a .htaccess file found in a phishing kit targeting French end-users.

FIG. 6 shows exemplary PHP phishing kit code that is configured to call a geolocation service to determine the geolocation of the connecting IP.

FIG. 8A is an example of a decision tree, according to one embodiment.

FIG. 8B is an example of a decision tree, according to one embodiment.

FIG. 8C is an example of a decision tree, according to one embodiment.

FIG. 15 is a block diagram of a computing device with which aspects of an embodiment may be practiced.

DETAILED DESCRIPTION

Figure 5:
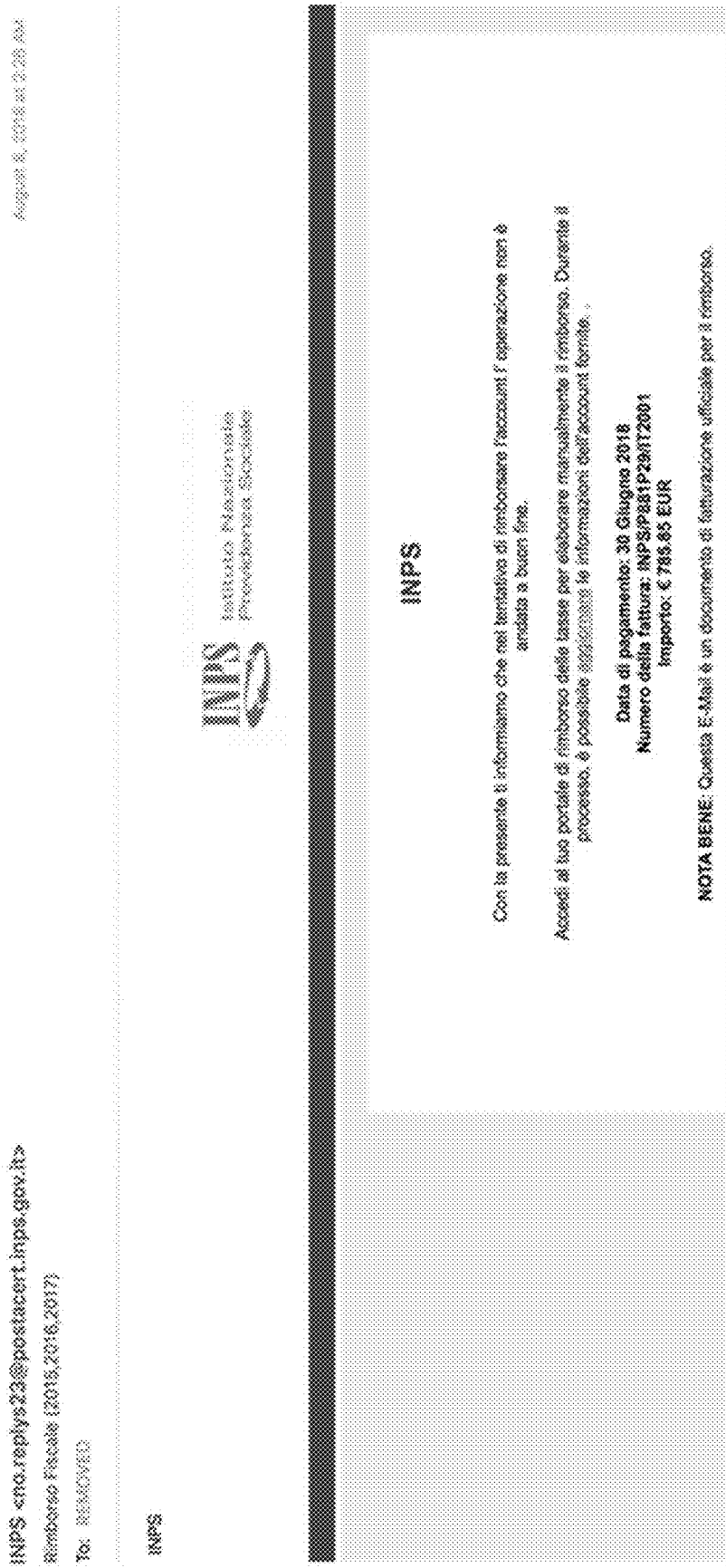
FIG. 5 shows a real-world example of an INPS phishing email.

A phishing kit is an electronic package that contains a complete phishing web site in an easy-to-deploy format. Phishing kits have evolved over time and have become increasingly complex. The most sophisticated phishing kits include techniques to thwart URL scanning technologies or any other suspect incoming Hyper Text Transfer Protocol (HTTP) connection. Typically, if the phishing kit detects a suspect incoming HTTP connection, instead of returning the phishing website content, the phishing kit may perform a defensive action to lure what could be potentially a URL scanning technology away from the malicious URL (in effect, saying "move along, nothing to see here!"). Herein, a defensive action may include one of the following:

- Return an innocuous HTTP 4xx client error code such as HTTP 400 Bad Request, HTTP 401 Unauthorized, HTTP 403 Forbidden or HTTP 404 Not found;
- Return an equally innocuous HTTP 5xx server error code such as HTTP 500 Internal Server Error;
- Redirect an incoming HTTP connection to the genuine URL of the targeted brand. For example, in the case of a phishing targeting PayPal, the suspect incoming HTTP connection may be redirected to https://www.paypal.com, the legitimate PayPal site, or
- Redirect an incoming HTTP connection to a benign and innocuous site. For example, the suspect incoming HTTP connection may be redirected to search engine URL, such as https://www.google.com.

The above list is not exhaustive and may also include any other defensive action performed by the phishing kit to prevent the potential URL scanning technology from accessing or learning of the very existence of a fraudulent phishing website.

Phishing kits may evaluate an incoming HTTP connection by analyzing features such as:
- the connecting IP address;
- the reverse DNS of the connecting IP address;
- the geolocation of connecting IP address;
- the User-Agent header;
- the Referer header, and/or
- the Accept-Language header.

This list is also not exhaustive and may also include any other feature that may be directly or indirectly related to an incoming HTTP connection that the fraudster may consider germane to their evaluation of a suspect (e.g., URL scanning technology-containing) incoming HTTP connection. In this case, the suspect incoming HTTP connection may be a connection that originates or is sent on behalf of a security company. Using these and other techniques, cybercriminals attempt to limit access to their phishing website to only legitimate (real potential victims) and unsuspecting marks (such as the target recipients of the malicious electronic messages) and deny access to or redirect security companies away from the fraudulent phishing websites.

The above-listed features, which may be indicative of a URL scanning technology incoming HTTP connection, may be used by the cybercriminals who deployed the phishing kit to identify a security vendor or a security research organization, for the purposes of initiating some defensive action. Indeed, the connecting IP address may belong to one of the security companies. For instance, such IP addresses may be identified by matching the IP address of the incoming HTTP connection against a list of known IP ranges that belong to the aforementioned security companies. Alternatively, the identification of such IP addresses may be performed by comparing the reverse DNS of the connecting IP address with a list of domains or subdomains that belong to or are known to be used by security companies.

The User-Agent header is another feature that may be indicative of a connection performed by internet robots, scripts, automated software and the like, and that may give the incoming HTTP connection away as having originated by a security company.

Figure 1:
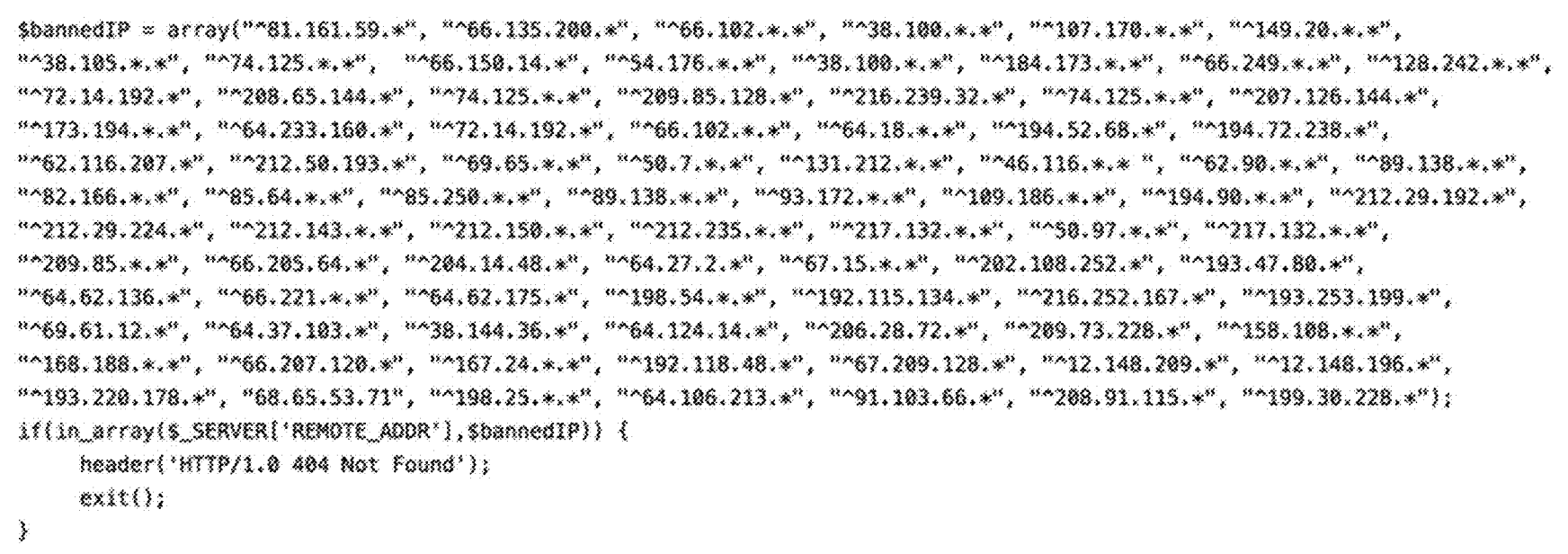

FIG. 1 is an example of PHP code found in a phishing kit that returns HTTP 404 to IP address ranges that are believed to be used by a security organization. As shown therein, the PHP code lists a number of banned IP ranges known to be used by security organizations. If the incoming HTTP connection is determined to originate from one of the banned IP ranges (where the "*" character is a wildcard), then the phishing kit returns (in this example) a HTTP 404 Not Found error code, thereby returning an innocuous-looking error code and hiding the very existence of a malicious website pointed to by a URL in the received electronic message from the scanners deployed by the security organization. For illustrative purposes, note that the first range 81.161.59.* belongs to the BitDefender security vendor. Therefore, if the phishing kit server that hosts the malicious website pointed to by a URL embedded in an electronic phishing message were to receive an incoming HTTP connection from an IP address within the IP address range of 81.161.59.*, the phishing kit server would not return the phishing website but instead would return an HTTP 404 Not Found error or some other equivalent innocuous error code—or indeed some other defensive action.

The phishing kit containing the PHP code of FIG. 1 also contains the PHP code that returns the same HTTP 404 Not Found error code to incoming HTTP connections comprising one of the banned User-Agent headers, as shown in FIG. 2. As shown therein, if the incoming HTTP connection contains one of the listed User-Agent headers, the phishing kit returns the HTTP 404 Not Found error code. In FIG. 2, Googlebot is the search bot used by Google. Therefore, if the incoming HTTP connection includes a User-Agent header that identifies Googlebot, the code will return the HTTP 404 Not Found error code, thereby preventing the Google search bot from accessing and indexing the fraudulent webpage. This prevents indexing search engines from cataloging such fraudulent websites and prevents the fraudulent websites from showing up in searches.

FIG. 3 shows an excerpt of a .htaccess file found in another phishing kit. A .htaccess file is a configuration file for use on web servers running the Apache Web Server software. In FIG. 3, the .htaccess rules redirect incoming HTTP connection traffic originating from suspect IP addresses to the legitimate website that corresponds to the spoofed (fraudulent) website, again making detection of such fraudulent websites more difficult. Indeed, as shown in FIG. 3, if the incoming HTTP connection originates from one of the listed suspect IP addresses, the connection will be redirected to the corresponding legitimate website, rather than the fraudulent one, thereby giving the appearance of legitimacy. For example, if the incoming HTTP connection comes from one of the listed IP addresses associated with one of the security companies, then the phishing kit server redirects the connection away from a counterfeited PayPal website to https://www.paypal.com, the corresponding legitimate website—again, contributing the stealthiness of fraudulent website pointed to by the URL(s) embedded in the phishing electronic communication.

In combination, these features may also be used to enable cybercriminals to target a specific end-user type. Such targeting aims to ensure that the malicious phishing website content is returned only to the intended victims (who may be identified by matching a number of criteria) and to ensure that an error code is generated, or the incoming HTTP connection is redirected to a legitimate website otherwise. For example, the reverse DNS of the connecting IP address can be used to target end-users that connect with a specific ISP (Internet Service Provider such as Comcast, Cox, British Telecom, etc.) internet connection. Indeed, such ISPs are most often associated with consumer end-users, rather than commercial enterprises such as security companies. For example, specific combinations of features may be used to increase the probability that the incoming HTTP connection looks like it originated from an ISP customer, the intended phishing target. Such incoming HTTP connections from ISP customers may be granted access to the phishing website, while all other will be denied access thereto, either through redirection or through returning an error message.

The geolocation of the connecting IP may also be used to target end-users that connect from a specific country. IP address geolocation data may include information such as country, region, city, postal/zip code, latitude, longitude and time zone. Deeper data sets can determine other parameters such as domain name, connection speed, ISP, language, proxies, company name, US Designated Market Area/Metropolitan Statistical Area (DMA/MSA), North American Industry Classification System (NAICS) codes, and home/business. For example, and significantly with respect to embodiments, a phishing website that counterfeits a Japanese bank website may consider internet traffic coming from IP addresses geolocated outside of Japan to be suspect, as most Japanese customers of the Japanese bank (the phisher's intended victims) will customarily connect from an IP address geolocated in Japan.

The User-Agent header may also be used to target users of specific devices, operating systems and internet browsers, as the User-Agent value customarily contains this information. For example, the User-Agent header may be used in the context of a phishing that targets only iPhone users. The Accept-Language header may also be used to target end-users that use a specific language. For example, a phishing website that counterfeits a Japanese bank website may consider an incoming HTTP connection that includes an Accept-Language header that does not contain Japanese to be suspect and may deny that incoming connection access to the counterfeited website.

FIG. 4 is an example of a .htaccess file found in a phishing kit targeting French end-users. In this phishing kit, the phishing website is only displayed to end-users that connect from a French ISP (SFR, Numericable, Nordnet . . . ) IP address. End-users that connect from other ISPs are denied access.

As a growing number of cybercriminals are implementing mechanisms to detect and defeat URL scanning technologies, as detailed above, a significant need has arisen to improve these existing URL scanning technologies so that they remain effective in protecting end-users by detecting and blocking cyberthreats.

As noted above, cyberthreats are often spread by inserting malicious URLs in electronic messages such as emails, text messages or instant messages that are sent to the potential victims. According to one embodiment, the electronic message and its context may be deconstructed and analyzed to yield a great deal of useful information that may be used to determine a set of parameters that are referred to herein as optimal scanning parameters for the analysis of the suspicious URL(s) it contains. Such optimal scanning parameters, according to one embodiment, may be used by a URL scanning service to scan the suspicious URLs without generating defensive actions; that is, while appearing to be one of the phishing site's intended victims.

Consider the phishing email shown in FIG. 5. As this is a real-word example of a phishing electronic message, the recipient has been removed. According to one embodiment, analysis of the email reveals a number of significant features that may be used to determine the optimal scanning parameters. These include the From header which, as shown in FIG. 5, contains INPS <no.replys23@postacert.inps.gov.it>. INPS is a major government institution in Italy and, as such, phishing counterfeiting INPS is quite common in Italy. Note that INPS is specific to the Italian context. Thus, it is very unlikely that non-Italian end-users would be targeted by this phishing electronic message. Note also that the country code top-level domain (ccTLD) of the email address is it, which is the ccTLD that denotes Italy. The To header contains the recipient display name and email address, which have been removed for privacy reasons. As shown in FIG. 5, the language used in Subject header is Italian, as is the language used in the body of the email. Note that the ccTLD of the removed email address was it, and that DNS queries on the domain show that IP addresses associated to MX records are all geolocated in France and that IP addresses associated to A records are all geolocated in Italy. A mail exchanger record (MX record) is a type of certified and verified resource record in the Domain Name System (DNS) that specifies a mail server responsible for accepting email messages on behalf of a recipient's domain, and a preference value used to prioritize mail delivery if multiple mail servers are available. A records are the most basic type of DNS record and are used to point a domain or subdomain to an IP address. Assigning a value to an A record requires providing a DNS management panel with a TTL and an IP address to which the domain or subdomain should point.

From the foregoing, it is likely that this phishing attempt specifically targeted an Italian end-user. According to one embodiment, therefore, a successful scan of the URL(s) embedded in this email may be performed using:
    An IP address that is geolocated in Italy (See FIG. 10, URL Scanning Service and HTTP proxies); and
    An Accept-Language header that contains at least it-IT
    Formalizing the language, let M denote an electronic message (including, but not limited to email, text, instant message, etc.) that contains at least one URL. Each such electronic message M may contain one or more URLs that may point the unsuspecting end-user to a malicious website. One or more of these embedded URLs may be selected for scanning. That is, a single one of the embedded URLs may be selected for scanning, more than one but fewer than all URLs may be selected for scanning or all of the URLs embedded in the electronic message may be selected for scanning. The expression $U_M\{u_{M,1}, \ldots, u_{M,n}\}$ denotes the list of URLs selected in message M to scan. The list may be a singleton or may include more than one member.

The expression $U_M$=SelectURLs(M) denotes a function that analyzes message M, extract URLs from M and selects from among the extracted URLs those URL(s) to scan. In one embodiment, the selected URLs may be a subset of the URLs contained in M so that only the most suspicious URL or URLs will be considered for scanning. Toward that end, a suspicion score may be computed to enable the selection of the most suspicious URL(s). According to one embodiment, different features and computer-implemented methods may be used in the computation of the suspicion score. For example, whether the URL under consideration is clickable is a significant feature that may associated with higher suspicion scores. The suspicion score may be computed using, for example, anomaly detection algorithms, supervised learning algorithms, Natural Language Processing algorithms and/or computer vision algorithms, to name but a few possibilities. URLs associated with a high reputation domain may be disregarded or assigned a lower suspicion score, as it is very unlikely that URLs whose domain has a high reputation are malicious. See (HighReputationDomains) below. It is to be noted, however, that URL-shortening services domains such as bit.ly or ow.ly, although well-known and arguably of high reputation, are frequently abused by cybercriminals.

A list of p features extracted from message M may be represented as $F_M=\{f_{M,1}, \ldots, f_{M,p}\}$. The function $F_M$=ComputeFeatures(M) extracts the features $F_M$ from the different components of M and, as necessary, processes the extracted data according to a selected method. According to one embodiment, the components of M that may be considered for extraction may include, for example, the sender of M, the recipient of M, the content of M and/or any other header or metadata associated with M.

The features may be computed from the extracted data through one or more of analyzing text content, querying DNS, querying WHOIS, querying an IP address geolocation database, applying Natural Language Processing, for example to identify the main language used in M and/or applying computer vision algorithm such as the Scale-Invariant Feature Transform (SIFT) or Oriented FAST and rotated BRIEF (ORB) feature detection algorithms, for example, to recognize and to extract a brand logo in M that is rendered as an image. WHOIS is a query and response protocol that is widely used for querying databases that store the registered users or assignees of an Internet resource, such as a domain name, an IP address block or an autonomous system, but is also used for a wider range of other information. The protocol stores and delivers database content in a human-readable format.

Considering again the example of FIG. 5, a set of categorical features computed may include:
    Sender display name contains INPS;
    Sender email address name contains inps;
    Sender email address ccTLD is it;
    Recipient email address ccTLD is it;
    Recipient email address domain MX records are geolocated in France;
    Recipient email address domain A records are geolocated in Italy;
    Main language of subject is Italian;
    Main language of body is Italian;
    INPS found in body;
    INPS logo found by Computer Vision in body;
    An alternative set of features, that mix categorical, discrete and continuous values, and that consider INPS as being one of many Italian brands, may include:
    Sender field contains 2 references to an Italian brand;
    Sender email address ccTLD is it;
    Recipient email address ccTLD is it;
    Probability that main language of subject is Italian is computed to be 0.985;
    Probability that main language of subject is French is computed to be 0.015;
    Probability that main language of body is Italian is computed to be 1.000;

Probability that an Italian brand logo has been found by computer vision in body is computed to be 0.992.

Features may be different for other type of messages, such as text messages and instant messages, as these messages may have different data available that may drive the selection of the features. This set of categorical, discrete and continuous features may be typically described by a feature vector.

Optimal scanning parameters may now be determined. According to one embodiment, optimal scanning parameters $SP_M = \{sp_{M,1}, \ldots, sp_{M,q}\}$ may be returned by a function $SP_M = \text{DetermineSP}(F_M)$. Such optimal scanning parameters, according to one embodiment, may include one or more of the following parameters:

IP address used for scanning;
Geolocation of the IP address used for scanning;
A constraint on the reverse DNS of the IP address used for scanning (for example, the reverse DNS shall be a subdomain of a predetermined selected domain name);
A constraint on the WHOIS of the IP address used for scanning (for example, the WHOIS record shall match a predetermined selected template);
Value of HTTP User-Agent header;
Value of HTTP Referer header, and
Value of HTTP Accept-Language header and the like.

It is to be noted that some parameters are dependent on others, as an IP address may already have a geolocation, may already have an associated reverse DNS and may already have WHOIS information. The above list of optimal scanning parameters is not intended to be an all-inclusive list of such possible parameters, as those of skill in this art may recognize.

Below is an example of optimal scanning parameters:
IP address geolocated in Italy, and
Accept-Language header that contains it-IT.it;q=0.9,en;q=0.8

In this case, the optimal scanning parameters include that the IP address is geolocated in Italy. Furthermore, the HTTP client advertises to the server that content should be delivered in Italian or alternatively in English, with respective q-value priorities of 0.9 and 0.8.

Here is another example of such optimal scanning parameters:
IP address reverse DNS is a subdomain of bboxfr (See FIG. 10 URL Scanning Service and HTTP proxies);
Accept-Language header contains fr-FR,fr;q=0.8,en-US;q=0.6,en;q=0.4, and
User-Agent header contains Mozilla/5.0 (Macintosh; Intel Mac OS X 10_13_6) AppleWebKit/537.36 (KHTML, like Gecko) Chrome/68.0.3440.106 Safari/537.36.

The optimal scanning parameters, in this case, include that the IP address reverse DNS includes the subdomain bbox.fr, that the User-Agent header indicates, among other details, a Chrome browser version 68.0.3440.106 running on an Intel Mac OS X 10.13.6 computer.

In this manner, the function $SP_M = \text{DetermineSP}(F_M)$, according to one embodiment, determines optimal scanning parameters for message M. This function takes $F_M = \{f_{M,1}, \ldots, f_{M,p}\}$ features as an input and returns $SP_M$ $\{SP_{M,1}, \ldots, SP_{M,q}\}$ scanning parameters. According to one embodiment, this function may be or include an algorithm or a combination of algorithms such as, for example, a decision tree or a combination of decision trees and/or a neural network or a combination of neural networks and may be trained, for example, with Supervised Learning methods. See FIG. 7 for an example of decision tree and FIGS. 8A, 8B and 8C for an example of combination of decision trees.

Example 1: Decision Tree

Figure 7:
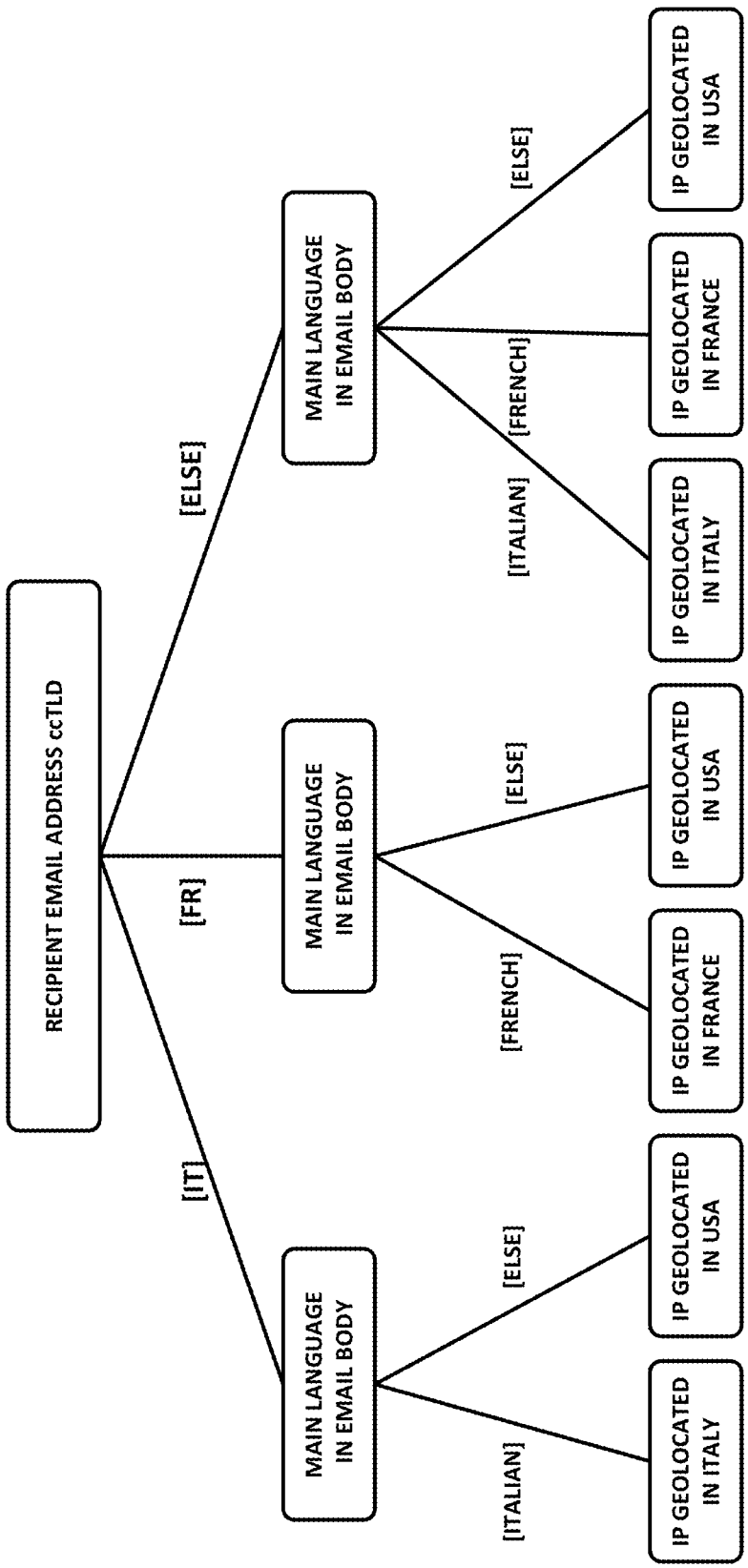
FIG. 7 is a decision tree with which optimal scanning parameters may be selected, according to one embodiment.

In one embodiment, the function $SP_M = \text{DetermineSP}(F_M)$ may, according to one embodiment, select optimal scanning parameters using a decision tree or a combination of decision trees. A decision tree consists of a set of nodes N and a set of edges E that form a rooted tree: it is a directed tree with a node called root that has no incoming edges. All other nodes have exactly one incoming edge. A node with outgoing edges is called an internal node or test node. All other nodes are called leaves or terminal nodes. The decision tree, according to one embodiment, may be configured to take $F_M$ features or a subset of $F_M$ features as an input such that each test node considers a subset of $F_M$ features and each terminal node outputs one or more $sp_{M,i}$ scanning parameters. A decision tree may be constructed manually. Alternatively, a decision tree may be constructed programmatically in the context of Supervised Learning. FIG. 7 is an example of a decision tree, where:

the two $F_M$ input features are 1) the Recipient email address' country code top level domain ccTLD and 2) the Main Language in the email body; and
the single output $SP_M$ scanning parameter is IP address geolocation.

As shown, if the ccTLD is Italy, and the main language in the email body is Italian, the $SP_M$ scanning parameter IP address geolocation is Italy. If the main language in the email body is other than Italian, the IP address geolocation defaults, in this exemplary implementation, to USA. Similarly, if the ccTLD is France, and the main language in the email body is French, the $SP_M$ scanning parameter IP address geolocation is France. If the main language in the email body is other than French, the IP address geolocation defaults, in this decision tree, to USA. Likewise, if the ccTLD is other than Italy or France and the main language in the email body is Italian, the $SP_M$ scanning parameter IP address geolocation is Italy. If the ccTLD is other than Italy or France and the main language in the email body is French, the $SP_M$ scanning parameter IP address geolocation is France. If the ccTLD is other than Italy or France and the main language in the email body is other than Italian or French, the IP address geolocation defaults to USA in this example.

FIGS. 8A, 8B and 8C are examples of combination of decision trees, according to one embodiment. Each decision tree produces an output, and these outputs may be collected and combined to output a collaborative decision. That is, according to one embodiment, each decision tree output may be considered to produce the final output. An example of strategy may be to select the decision that was taken by the majority of decision trees. As shown in FIG. 8A, if the ccTLD of the Recipient's email address is Italy, the decision tree outputs that the IP address is geolocated in Italy. Similarly, if the ccTLD of the Recipient's email address is France, the decision tree of FIG. 8A outputs that the IP address is geolocated in France. If the ccTLD of the Recipient's email address is neither Italy nor France, the decision tree defaults (in this example) to the IP address being geolocated in the US.

As shown in FIG. 8B, if the main language in the email body is Italian, the decision tree outputs that the IP address is geolocated in Italy. Similarly, if the ccTLD of the Recipient's email address is French, the decision tree of FIG. 8B outputs that the IP address is geolocated in France. If the main language in the email body is neither Italian nor French, the decision tree of FIG. 8B defaults to the IP address being geolocated in the USA in this example.

FIG. 8C is a decision tree that is configured to select an IP address geolocation based on the recognition of a brand logo, trademark or other identifiable characteristic. If no brand logo is recognized in the body of the email, in one embodiment, the tree defaults to the IP address being geolocated in the US. As shown therein, if a brand logo is recognized in the body of the email, it may then be determined whether the brand is known and associated with a geolocation. For example, if a brand logo is recognized and identified as, for example, INPS, Poste Italiane, Bank of Italy or another Italian brand, the IP address geolocation is determined to be Italy. Similarly, if a brand logo is recognized and identified as, for example, BNP Paribas, Société Générale or another French brand, the IP address geolocation is determined to be France. In all other cases, the decision tree defaults to the IP address being geolocated in the US.

It is to be understood that FIGS. 8A, 8B and 8C are but examples of simplified decision trees and that, in use, such decision trees may be much larger and deeper.

Example 2: Supervised Learning Algorithm with Reverse Engineering of Phishing Kits In one embodiment, the function $SP_M = DetermineSP(F_M)$ may, according to one embodiment, select optimal scanning parameters using a supervised learning algorithm with reverse engineering of phishing kits. Consider a pair (PM, PK) where PM is a phishing message and PK the phishing kit that is associated with the malicious URL contained in PM. A set of n such pairs $\{(PM_1, PK_1), \ldots, (PM_n, PK_n)\}$ is then collected. Consider now a Supervised Learning algorithm. For each pair $(PM_i, PK_i)$, the Supervised Learning algorithm considers:

$F_{PM_i}$=ComputeFeatures($PM_i$) as the input feature vector, and $SP_{PK_i}$ as the desired output vector, where $SP_{PK_i}$ is the set of scanning parameters that may be determined by a manual or automated reverse engineering of $PK_i$ phishing kit.

The supervised learning algorithm's task is to seek an optimal function g:X→Y that maps the input space $X = \{F_{PM_1}, \ldots, F_{PM_n}\}$ to the desired output space $Y = \{SP_{PK_1}, \ldots, SP_{PK_n}\}$.

For example, let's consider the pair $(PM_1, PK_1)$ where:
$PM_1$ is the phishing message presented in the exemplary INPS phishing message of FIG. 5; and
$PK_1$ is the phishing kit associated to the malicious URL contained in $PM_1$.

A manual or programmatic reverse engineering of the source code of the phishing kit shows that:
The phishing kit returns HTTP 200 OK and the phishing webpage content when the connecting IP address is geolocated in Italy;
Otherwise, the phishing kit returns HTTP 404 Not Found error code without any content.

FIG. 6 shows exemplary PHP phishing kit code that is configured to call the geolocation service to determine the geolocation of the connecting IP.

For the pair $(PM_1, PK_1)$, the Supervised Learning algorithm considers:
$F_{PM_1}$=ComputeFeatures($PM_1$) as the input feature vector.
Example of features may include:
Recipient email address ccTLD is it
Main language in body is Italian
Italian brand logo found $SP_{PK_1}$ as the desired output vector i.e., the desired set of scanning parameters that is to say IP geolocated in Italy.

To train and test the Supervised Learning algorithm with accuracy, it is preferable to collect many more $(PM_i, PK_i)$ pairs.

Example 3: Supervised Learning Algorithm with TestScanURL

In one embodiment, the function $SP_M = DetermineSP(F_M)$ may select optimal scanning parameters using a supervised learning algorithm where the optimal scanning parameters for the training of DetermineSP underlying the supervised learning model are determined using a TestScanURL($SP_M$, $mu_M$) function. The TestScanURL($SP_M$, $mu_M$) function, according to one embodiment, may be used during training of the DetermineSP function that selects the optimal scanning parameters. The TestScanURL($SP_M$, $mu_M$) function, according to one embodiment, is not used in any URL scanning technology or in any message service context, when an email is received, as its purpose is limited to train the DetermineSP function, as discussed in greater detail hereunder.

Consider a pair (M, $SP_M$) where M is a message containing a malicious URL $mu_M$ and $SP_M$ scanning parameters such that TestScanURL($SP_M$, $mu_M$) returns 1. A set of n training pairs of messages and optimal scanning parameters $\{(M_1, SP_{M_1}), \ldots, (M_n, SP_{M_n})\}$ are collected. Consider now a Supervised Learning algorithm that, for each pair $(M_i, SP_{M_i})$, considers:

$F_{M_i}$=ComputeFeatures($M_i$) as the input vector, and
$SP_{M_i}$ as the desired output vector.

The Supervised Learning algorithm's task is to seek an optimal function g:X→Y that maps the input space $X = \{F_{M_1}, \ldots, F_{M_n}\}$ to the desired output space $Y = \{SP_{M_1}, \ldots, SP_{M_n}\}$.

For example, let's consider the pair $(M_1, SP_{M_1})$ where:
$M_1$ is the phishing message presented in FIG. 5, (INPS phishing message) and mu, is the malicious URL contained in $M_1$; and
$SP_{M_1}$ is the set of scanning parameters such that TestScanURL($SP_{M_1}$, $mu_{M_1}$) returns 1. $SP_{M_1}$ may be discovered thanks to TestScanURL.

For example, an exhaustive search of scanning parameters may be performed with TestScanURL to find $SP_{M_1}$. Let's consider the case of a single scanning parameter $IP_{country}$ that is the country associated with the connecting IP's geolocation. According to one embodiment, steps may include:

Step 1: TestScanURL($IP_{USA}$, $mu_{M_1}$) returns 0, as HTTP 404 Not Found error code is returned;
Step 2: TestScanURL($IP_{France}$, $mu_{M_1}$) returns 0, as HTTP 404 Not Found error code is returned; and
Step 3: TestScanURL($IP_{Italy}$, $mu_{M_1}$) returns 1, as HTTP 200 OK status code is returned with the phishing webpage content. Thus, $SP_{M_1} = IP_{Italy}$.

Alternate methods may be used. For example, we may use $F_{M_i}$=ComputeFeatures($M_1$) to narrow down the search space.

The function res=TestScanURL($SP_M$, $u_{M,i}$), according to one embodiment, is a function that performs a HTTP GET request on URL $u_{M,i}$ with $SP_M$ scanning parameters to request data on the web resource pointed to by URL $u_{M,i}$ with SP scanning parameters. Note that this function may follow any redirections it encounters, as there may be one or several redirections. A redirection can be performed in different ways (HTTP 3xx redirection such as HTTP 301

Moved Permanently, HTML meta refresh redirection, JavaScript redirection). This TestScanURL($SP_M$, $u_{M,i}$) function returns a res value of 0 when a defensive action on the server side of the scanned URL is suspected and returns 1 otherwise. A defensive action, according to one embodiment, is suspected if and only if the HTTP GET request on the URL leads to one of the following results:
- an HTTP 4xx client error code such as HTTP 400 Bad Request, HTTP 401 Unauthorized, HTTP 403 Forbidden or HTTP 404 Not found, or
- an HTTP 5xx server error code such as HTTP 500 Internal Server Error, or
- a redirection to an URL whose domain belongs to HighReputationDomains, discussed further below.

Redirection to an URL Whose Domain Belongs to HighReputationDomains

As noted above, there may be several redirections, and a redirection can be performed in different ways (HTTP 3xx redirection such as HTTP 301 Moved Permanently, HTML meta refresh redirection, JavaScript redirection). The construct HighReputationDomains may include a list of domain names that enjoy a high reputation, that are well-known and that are generally trusted. High reputation domain names may include, for example, search engine domains, social networks domains, financial services domains, ecommerce company domains, ISP domains and others. Accordingly, examples of HighReputationDomains include google.com, facebook.com, linkedin.com, wellsfargo.com, chase.com, paypal.com, amazon.com, orange.fr. Generally, domains belonging to an organization that is regularly targeted and counterfeited by cybercriminal by means of phishing, ransomware and the like, will be represented in the HighReputationDomains list. It is noted that this list may be generated automatically using, for example, technologies such as Google PageRank.

URL Rewriting

M'=RewriteURLs(M, USS, $U_M$, $SP_M$) is a function that, in one embodiment, rewrites URLs $U_M=\{u_{M,1}, \ldots, u_{M,n}\}$ in message M. The URL rewriting transforms a selected URL $u_{M,i}$ in message M to a rewritten URL $u'_{M,i}$ that will pose less danger to the end-user when he or she retrieves the rewritten message from his or her mailbox, opens the rewritten message and clicks on the rewritten URL contained therein. Indeed, the rewritten URL now points to a URL scanning service and not to the potentially malicious URL that was originally-contained in the message M. This function takes the following input parameters:
- The message M;
- USS which is the base URL of the URL Scanning Service;
- URLs to rewrite $U_M=\{u_{M,1}, \ldots, u_{M,n}\}$ where $U_M$=SelectURLs(M); and
- $SP_M \{sp_{M,1}, \ldots, sp_{M,q}\}$ scanning parameters For each URL $u_{M,i}$ the RewriteURLs(M, USS, $U_M$, $SP_M$) function computes a rewritten URL $u'_{M,i}$ such as:
- USS serves as the base URL for $u'_{M,i}$;
- $u_{M,i}$ is passed as a first URL parameter that is encoded and stored in the URL path or query string; and
- $SP_M=\{SP_{M,1}, \ldots, Sp_{M,q}\}$ is passed as one or several second URL parameters that is encoded and stored in the URL path or query string.

Then, the RewriteURLs(M, USS, $U_M$, $SP_M$) function replaces each URL $u_{M,i}$ with the rewritten URL $u'_{M,i}$.

Finally, the RewriteURLs(M, USS, $U_M$, $SP_M$) function returns the updated message M' that contains the rewritten $\{u'_{M,1}, \ldots, u'_{M,n}\}$ URLs, which message M' may then be stored in the end-user's mailbox for further use.

URL Rewriting Example

Here is an example of the RewriteURLs(M, USS, $U_M$, $SP_M$) in action, according to one embodiment. Let's consider the following exemplary values:
- USS=http://urlscanningservice.com as base URL for URL scanning service
- $u_{M,i}$=http://www.unknown.com/index.html
- $SP_M$={IP geolocated in USA}

A rewriting of $u_{M,i}$ may be:
- $u'_{M,i}$=http://urlscanningservice.com/url/ aHR0cDovL3d3dy51bmtub3duLmNvbS9pbmRle C5odG1s/g eoip/dXNh In this example, $u_{M,i}$ and $SP_M$ have been encoded and stored as parameters in the URL path:
- the "aHR0cDovL3d3dy51bmtub3duLmNvbS9pbm RleC5odG1" parameter value results from the encoding of http://www.unknown.com/index.html in Base64. The parameter value is preceded by url parameter key. The parameter key and value are separated by forward slash character.
- the dXNh parameter value results from the encoding of the string usa in Base64. The parameter value is preceded by geoip parameter key. Here too, the parameter key and value are separated by forward slash character.

It is to be noted that Base64 is only one of many possible formats into which the parameters may be encoded in the context of URL rewriting. URL rewriting is a popular technique in the context of message security to protect end-users against malicious links. Microsoft Office 365 ATP Safe Links, Mimecast URL Protect and Proofpoint URL Defense are examples of such implementations.

Figure 9A:
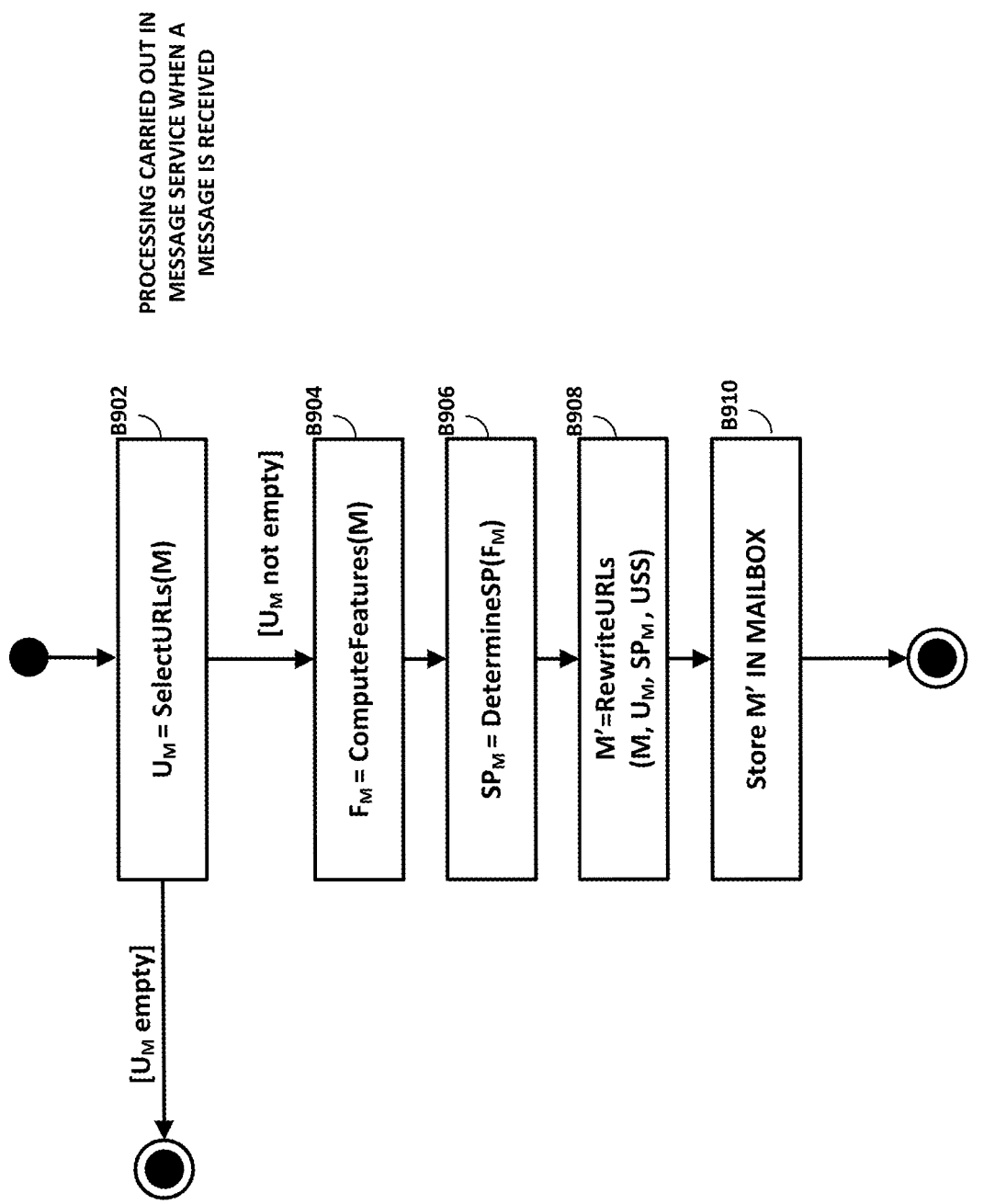
FIG. 9A is a diagram illustrating aspects of a computer-implemented method according to one embodiment.

FIG. 9A is a flowchart of a computer-implemented method according to one embodiment. As shown therein, block B902 calls for extracting and selecting one or more URLs $U_M=\{u_{M,1}, \ldots, u_{M,n}\}$ from a received electronic message M. If no URLs are present in message M ($U_M$ is empty) the present computer-implemented method ends. In one embodiment, the selected URLs may be a subset of the URLs contained in M so that only the most suspicious URLs will be considered for scanning. As noted above, toward that end, a suspicion score may be computed and used to determine and assign a rank score to the perceived suspiciousness of the URLs contained in M. The suspicion score may be computed using, for example, anomaly detection algorithms, Supervised Learning algorithms, Natural Language Processing algorithms and/or computer vision algorithms, to name but a few possibilities. URLs associated with a high reputation domain may be disregarded or assigned a lower suspicion score, as it is very unlikely that URLs whose domain has a high reputation are malicious.

As shown in FIG. 9A, assuming one or more URLs are present and have been selected in message M ($U_M$ is not empty), block B904 may be carried out, which calls for a list of p features $f$ to be extracted from message M, represented as $F_M \{f_{M,1}, \ldots, f_{M,p}\}$ by function $F_M$=ComputeFeatures (M). The features $F_M$ may be computed by extracting data from the different components of M and by processing the extracted data according to one or more selected methods. According to one embodiment, the components of M that may be considered for extraction may include, for example, the sender of M, the recipient of M, the content of M and/or any other header or metadata associated with electronic message M. The features may be computed from the extracted data through one or more of analyzing the content of the text, by querying the DNS, by querying WHOIS, by accessing, over a computer network, and querying an IP address geolocation database, by applying Natural Language Processing, for example, to identify the main language used in M and/or by applying computer vision algorithms to recognize and to extract a trademarked graphics or other brand logos in M that are rendered as images. Other features may be extracted as well, in addition or in place of the aforementioned features.

Block B906 takes the $F_M$ output of B904; namely the features extracted from the electronic message M and computes optimal scanning parameters using, according to one embodiment, a function $SP_M$=DetermineSP($F_M$). This function determines optimal scanning parameters for message M by taking $F_M$={$f_{M,1}$, ..., $f_{M,p}$} features as an input and returning $SP_M$={$sp_{M,1}$, ..., $sp_{M,q}$} optimal scanning parameters that may be used to scan one or more selected URLs in the electronic message. That is, if scanning of a suspected malicious or counterfeited website were to be performed using the aforementioned optimal scanning parameters, the webserver in question would be less likely to perform a defensive action and more likely to return the phishing website or webpage, thereby enabling its identification and enabling the security company to provide its customer with defenses thereagainst. According to one embodiment, such parameters may include, for example, an IP address used for scanning, the geolocation of the IP address used for scanning, a constraint on the reverse DNS of the IP address used for scanning, a constraint on the WHOIS of the IP address used for scanning, the value of HTTP User-Agent header, of the HTTP Referer header and/or the value of HTTP Accept-Language header. Other categorical, discrete and continuous values features may be returned, as disclosed herein. As noted above, the $SP_M$=DetermineSP($F_M$) function may draw on decision tree techniques, neural network techniques, a combination thereof and may be trained with, for example, Supervised Learning techniques. The TestScanURL($SP_M$, $mu_M$) function, according to one embodiment, may have been previously used to determine the optimal scanning parameters used to train the DetermineSP($F_M$) function underlying supervised learning model.

As shown in B908, using the message M, one or more extracted and selected URLs $U_M$, the optimal scanning parameters output by the DetermineSP($F_M$) function and the base URL USS for the URL to be rewritten, the RewriteURLs(M, USS, $U_M$, $SP_M$) function rewrites each suspicious URL $u_{M,i}$ in the message M and replaces it with the rewritten URL $u'_{M,i}$ in message M'. The message M' with the rewritten URL $u'_{M,i}$ therein may be stored in the end-user's mailbox, as shown at block B910 in FIG. 9A. At this point, the computer-implemented method carried out in the message service ends. Each rewritten URL $u'_{M,i}$ in message M', according to one embodiment, is safe for the user to click on, as it must first be decoded by the URL scanning service before the web resource to which it points may be resolved.

Figure 9B:
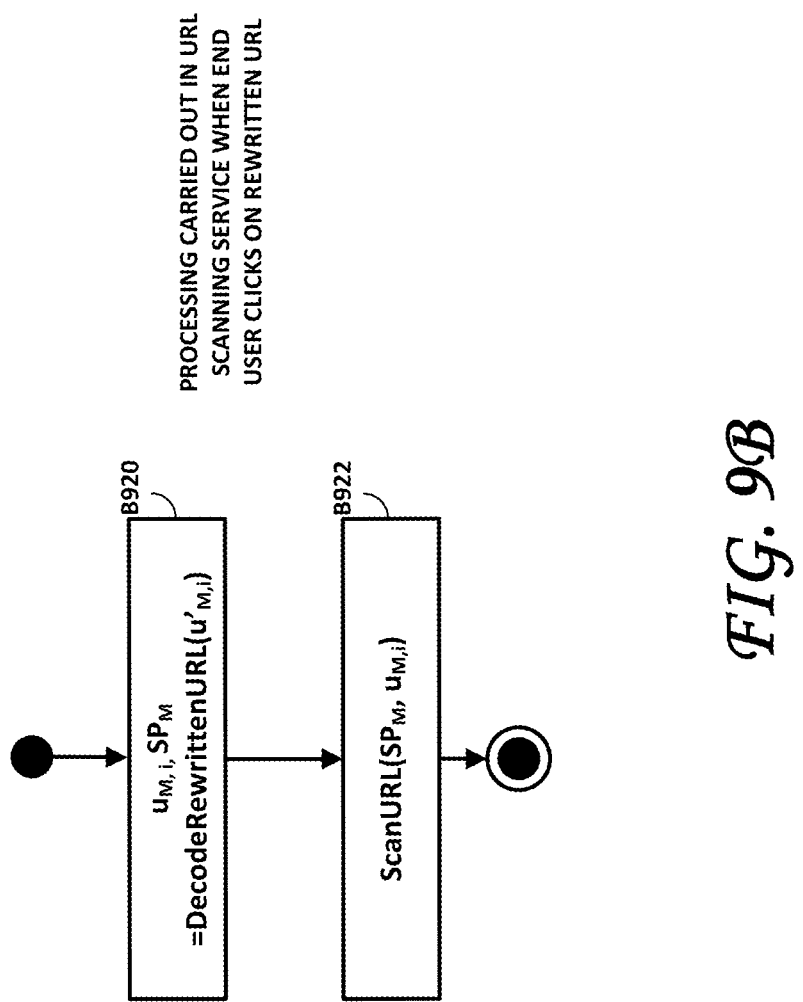
FIG. 9B is a diagram illustrating further aspects of a computer-implemented method according to one embodiment.

FIG. 9B is a flowchart of a computer-implemented method of decoding the rewritten URL and scanning the decoded URL, according to one embodiment. As shown at B920, the function $u_{M,i}$, $SP_M$=DecodeRewrittenURL($u'_{M,i}$), according to one embodiment, may be executed by the URL scanning service that is called when the end user clicks on any rewritten URL $u'_{M,i}$ in a message M' in his or her mailbox. The act of clicking or otherwise selecting the rewritten URL $u'_{M,i}$ causes a request to be generated and received and processed by the URL scanning service, as USS is the base URL of $u'_{M,i}$. As such, the function DecodeRewrittenURL($u'_{M,i}$) extracts $u_{M,i}$ and $SP_M$ from $u'_{M,i}$ so that the now decoded rewritten URL $u_{M,i}$ (the same as was included in the original message M) may be safely scanned with the extracted and decoded $SP_M$ scanning parameters.

The function ScanURL($SP_M$, $u_{M,i}$) performs a scanning of the now-decoded URL $u_{M,i}$ with the previously-determined optimal scanning parameters $SP_M$, as shown at block B922. Suitable URL scanning technologies are disclosed in commonly owned U.S. Pat. Nos. 9,398,047 and 10,423,366 filed on Nov. 27, 2018, both of which are incorporated herein by reference in their entireties.

Figure 10:
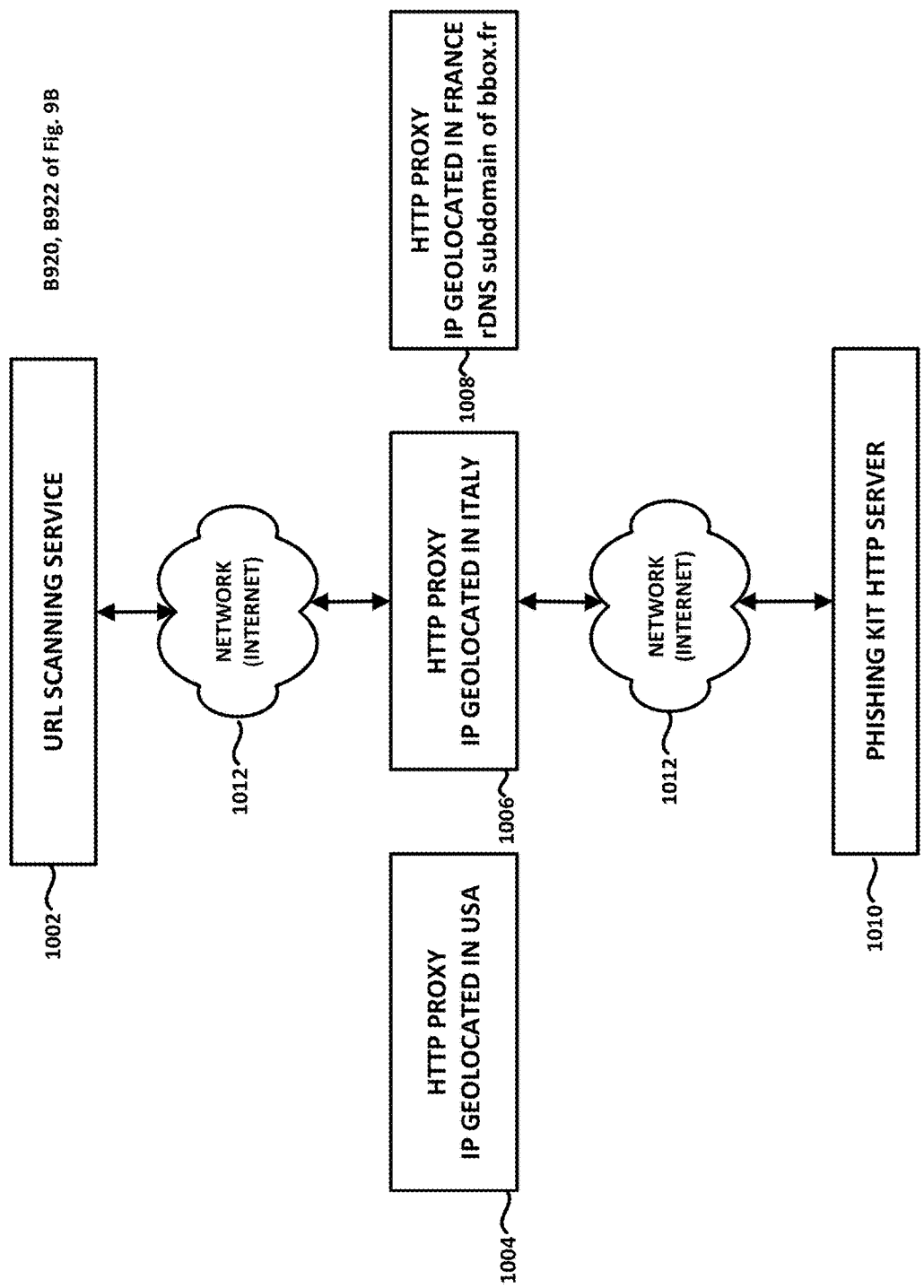
FIG. 10 is a diagram illustrating still further aspects of a computer-implemented method according to one embodiment.

FIG. 10 is a diagram illustrating further aspects of one embodiment, including the use of HTTP proxies in scanning URLs. As shown therein, URL scanning service 1002 may be configured to incorporate the functionality of blocks B920 and B922 of FIG. 9B. That is, when the end-user clicks on a rewritten URL, the act of clicking operates as a request to the URL scanning service to decode the rewritten URL passed as an encoded URL parameter thereto, as shown at B920, and to scan the decoded URL using the previously-determined and now decoded optimal scanning parameters $SP_M$ passed to the URL scanning service as encoded URL parameters, as shown at block B922 in FIG. 9B.

As shown in FIG. 10 and according to one embodiment, the URL scanning service 1002 that incorporates aspects of an embodiment, does not communicate, scan or otherwise interact with the HTTP server 1010 of the phishing kit. Instead, such scanning occurs at the direction of the URL scanning technology by a selected HTTP proxy. According to one embodiment, the selected HTTP proxy may be geolocated in a selected country, such as the country (USA, as shown at 1004, Italy as shown at 1006 or France as shown at 1008) of the intended recipient of the malicious message. The selected HTTP proxy 1004, 1006, 1008 or other (not shown), according to one embodiment, may respect the requirements of scanning parameters such as IP address, the aforementioned geolocation of the IP address, the reverse DNS of the IP address, WHOIS information related to the IP address, among other possible requirements. The HTTP proxy may also be geolocated in a selected country and have an IP address that is a subdomain of a selected domain, such as the domain bbox.fr (an illustrative example), as shown at 1008 in FIG. 10. This reduces the likelihood that the HTTP server of the phishing kit will perform a defensive action upon detecting a suspicious incoming connection. Significantly, the HTTP incoming connection, from the selected HTTP proxy 1004, 1006 or 1008, using the optimal parameters selected according to an embodiment, will appear to the HTTP server of the phishing kit 1010 as though it originated from a legitimate end-user (i.e., an intended phishing victim) located in the target country, rather than from a security company. It is through a selected HTTP proxy that the selected one or more URLs of the message M are scanned over a computer network 1012, using the previously-determined optimal scanning parameters.

Figure 11:
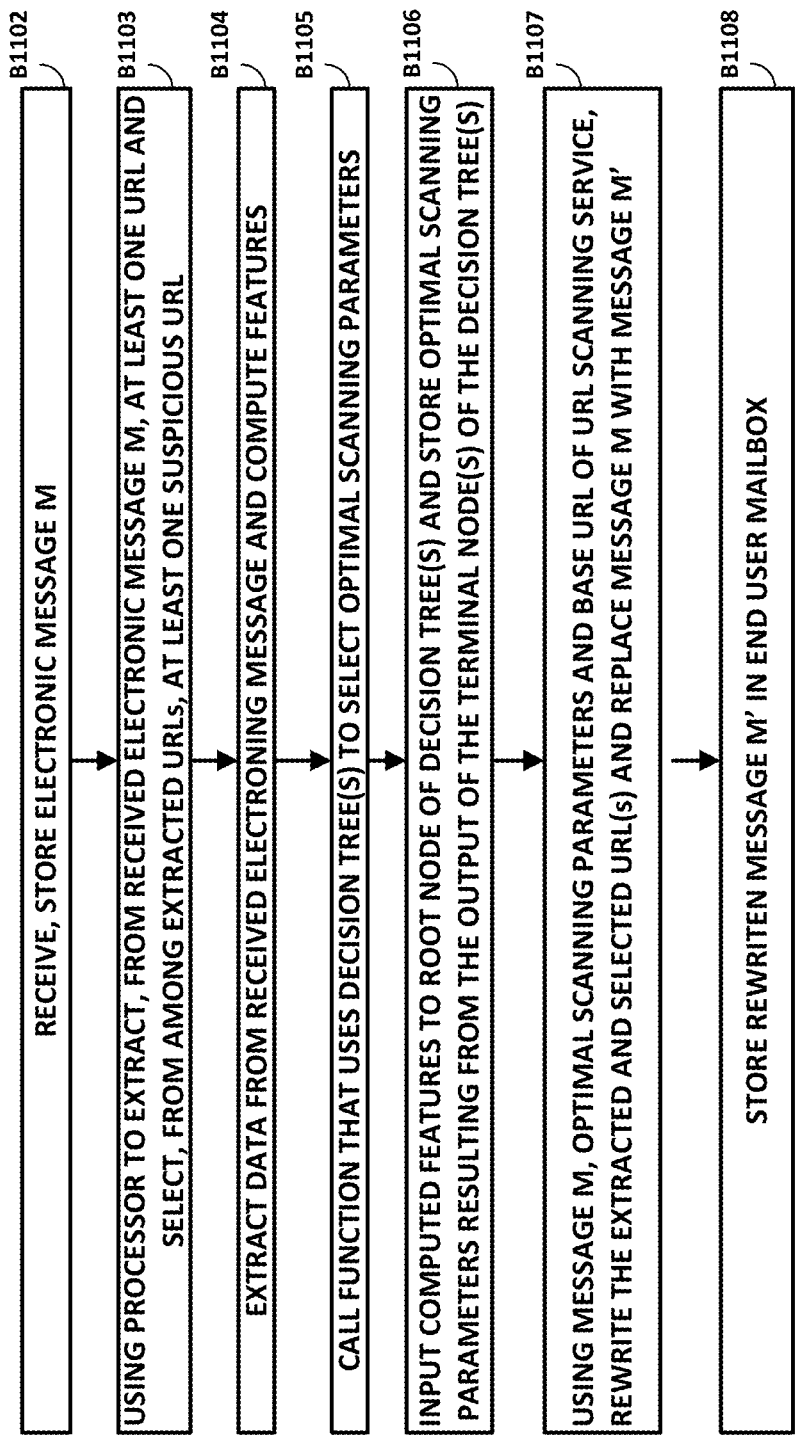
FIG. 11 is a flowchart of a computer-implemented method according to one embodiment.

FIG. 11 is a flowchart of a computer-implemented method according to one embodiment. As shown therein, block B1102 calls for receiving an electronic message M over a computer network in a computing device comprising a processor and memory. The received electronic message may then be stored in memory. As shown at B1103, using the processor, one or more URLs may then be extracted from the received electronic message. One or more (potentially) malicious or suspicious URLs may then be selected from among the extracted URLs. At block B1104, data is extracted from the received electronic message and features are computed from the extracted data. At B1105, a function (such as the DetermineSP($F_M$) function described above) may be called, which function may comprise one or more decision trees, as discussed relative to FIGS. 7, 8A, 8B and 8C. According to one embodiment, a decision tree may include a root node configured to accept the computed features, at least one internal node, each configured to evaluate a subset of the computed features and at least one terminal node configured to output one or more scanning parameters.

At B1106, the computed features may be input to the root node of the decision tree(s), a respective subset of the computed features may be evaluated at the internal node(s) and the optimal scanning parameters resulting from the output of the terminal node(s) of the decision tree(s) may be stored in the memory.

As shown in B1107, using the message M, one or more extracted and selected URLs $U_M=\{u_{M,1}, \ldots, u_{M,n}\}$, the optimal scanning parameters output by the DetermineSP ($F_M$) function and the base URL USS for the URL to be rewritten, suspicious URLs $\{u_{M,1}, \ldots, u_{M,n}\}$ in the message M may be rewritten (using the Rewrite URLs(M, USS, $U_M$, $SP_M$) function described above, in one embodiment) and replaced with the rewritten URLs $\{u'_{M,1}, \ldots, u'_{M,n}\}$ in a modified message M', which rewritten URLs comprises the base URL of the URL scanning service, an encoded version of the original URL $u_{M,i}$ as a first URL parameter and an encoded version of the optimal scanning parameters as a second URL parameter. Other parameters may be included, in addition to or in place of the aforementioned first and second URL parameters. As shown in B1108, the message M' with the rewritten URLs $\{u'_{M,1}, \ldots, u'_{M,n}\}$ that comprises the encoded optimal scanning parameters may now be safely stored in the end-user's mailbox (such as his or her Microsoft 365 inbox, Google Gmail inbox, etc.). At this point, the computer-implemented method carried out in the message service ends. The rewritten URLs $\{u'_{M,1}, \ldots, u'_{M,n}\}$ in message M', according to one embodiment, are safe for the user to click on, as these URLs points to the URL scanning service (as opposed to some potential malicious network resource such as a phishing website) and must be decoded by the URL scanning service before the original network resource to which it points may be resolved. However, none of the decoding and scanning occurs in the messaging service or endangers the user's confidential personal information.

Figure 12:
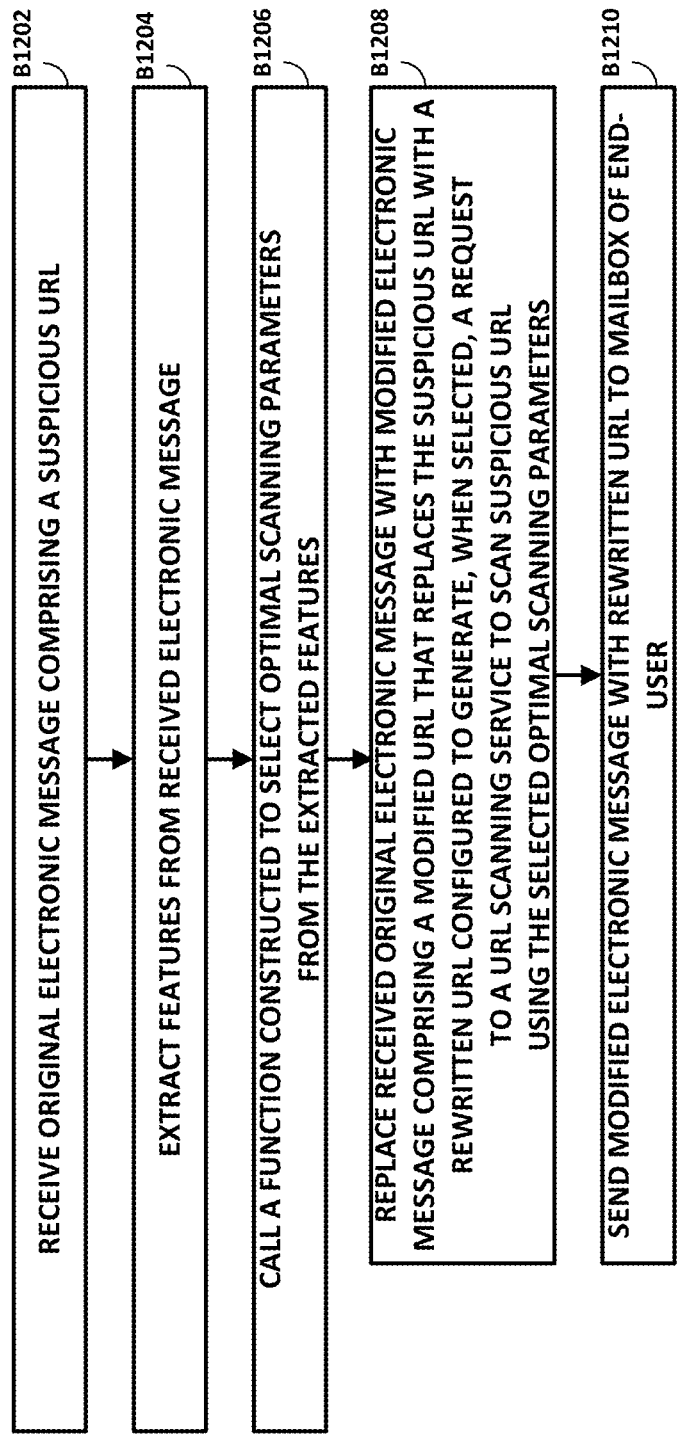
FIG. 12 is a flowchart of a computer-implemented method according to another embodiment.

FIG. 12 is a flowchart of a computer-implemented method according to one embodiment, from the point of view of the message service. As shown in block B1202, an original electronic message (e.g., an email in one embodiment) comprising a suspicious URL is received. Block B1202 may be carried out by, for example, a messaging service and not the end-user or the intended recipient of the electronic message. Features may then be extracted therefrom, as shown in B1204 and as described above. Thereafter, as shown at B1206, a function may be called, which function may be constructed to select optimal scanning parameters from the previously-extracted features. Those of skill in this art will recognize that one or more of the blocks, steps and described functionalities may be combined, broken out into sub-processes and/or replaced in whole or in part by functionally-equivalent processes. Block B1208 calls for replacing the received original electronic message M with a modified electronic message M' comprising a modified URL $u'_{M,i}$ that replaces the suspicious, original URL $u_{M,i}$ in the received original electronic message M with a rewritten URL that is configured to generate, when clicked, a request over the computer network to a URL scanning service to scan the suspicious URL using the optimal scanning parameters. In one embodiment, the modified URL $u'_{M,i}$ may include the base URL of the URL scanning service, a first URL parameter comprising an encoded version of the suspicious URL and a second URL parameter comprising an encoded version of the stored optimal scanning parameters. As shown in B1210, the modified electronic message M' with the rewritten URL $u'_{M,i}$ may then be sent to a mailbox of an end-user (usually the intended recipient of the electronic message).

Figure 13:
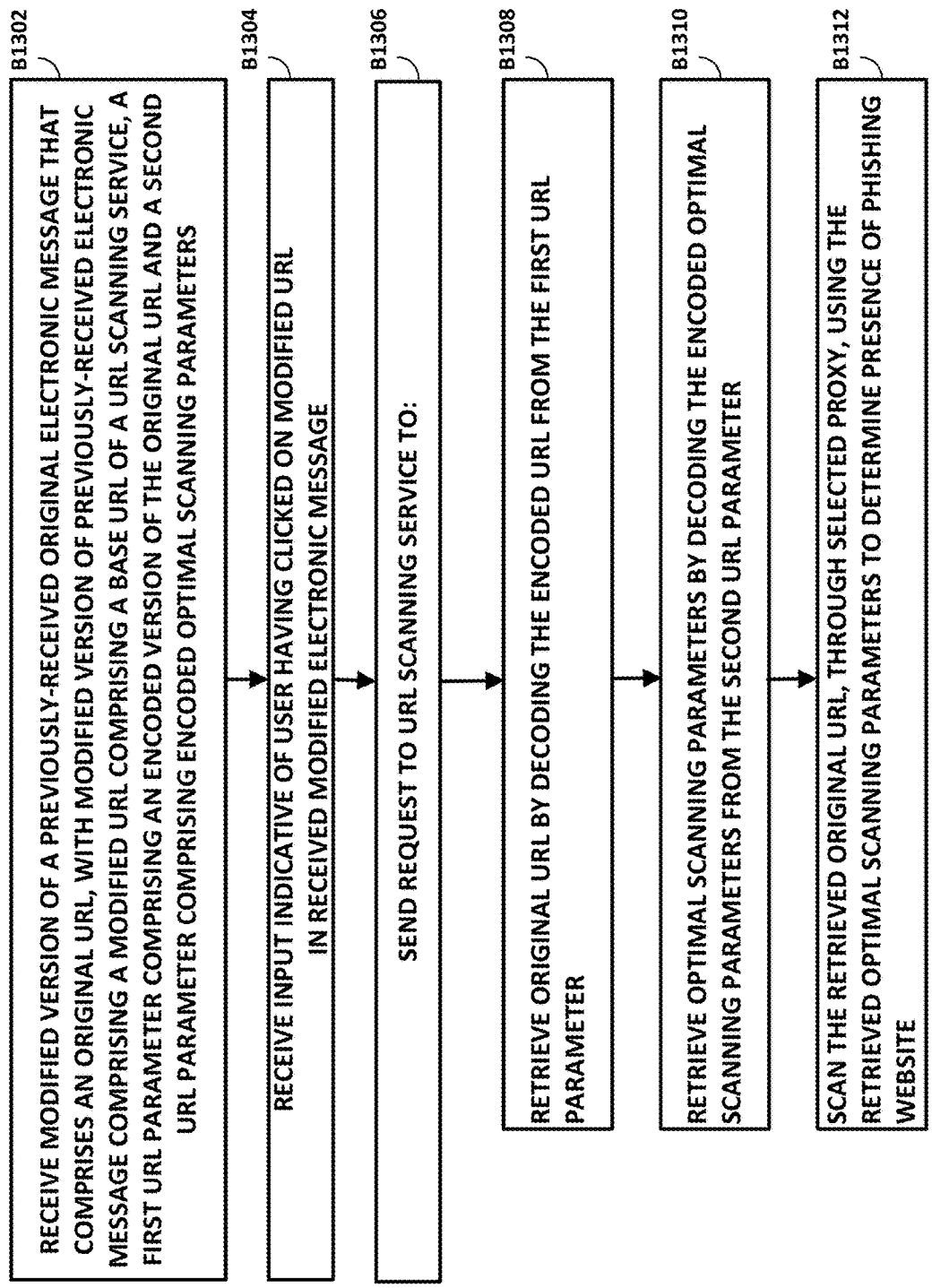
FIG. 13 is a flowchart of a computer-implemented method according to yet another embodiment.

FIG. 13 is a flowchart of a computer-implemented method from the point of view of the end-user (the intended recipient of the electronic message), according to one embodiment. As shown at B1302, the method may comprise receiving, over a computer network, a modified version of a previously-received original electronic message that comprises an original Uniform Resource Locator (URL). The modified version of the previously-received electronic message may comprise, according to one embodiment, a modified URL that includes a base URL of a URL scanning service, first URL parameter comprising an encoded version of the original URL and a second URL parameter comprising encoded optimal scanning parameters. As shown at B1304, input may be received that is indicative of a user having clicked on the modified URL in the received modified electronic message. Indeed, the user may have received and opened the rewritten electronic message M' containing the rewritten URL $u'_{M,i}$. As this electronic message now no longer contains the URL of the potentially malicious phishing kit HTTP server, he or she may click on the rewritten, modified URL safely, knowing (or being happily oblivious to the fact) that the URL has been rewritten into an encoded and thus innocuous form. In block B1304, therefore, the user does just that, and clicks on the rewritten and modified URL in the received modified message M'.

Clicking on the rewritten, modified URL causes a request to be sent to the URL scanning service, together with encoded URL parameters including the encoded URL and the previously-determined and now encoded optimal scanning parameters. This request calls on the URL scanning service to retrieve the original URL by decoding the encoded URL from the first URL parameter as shown at B1308. As shown at B1310, the request also calls on the URL scanning service to retrieve the optimal scanning parameter passed to it by decoding the encoded optimal scanning parameters from the second URL parameter. Lastly, at B1312, the request initiated by the end-user clicking on the modified URL in message M', calls on the URL scanning service to scan the retrieved original URL, through a selected proxy, using the retrieved optimal scanning parameters to determine the presence of a phishing website or other malicious network resource.

Figure 14:
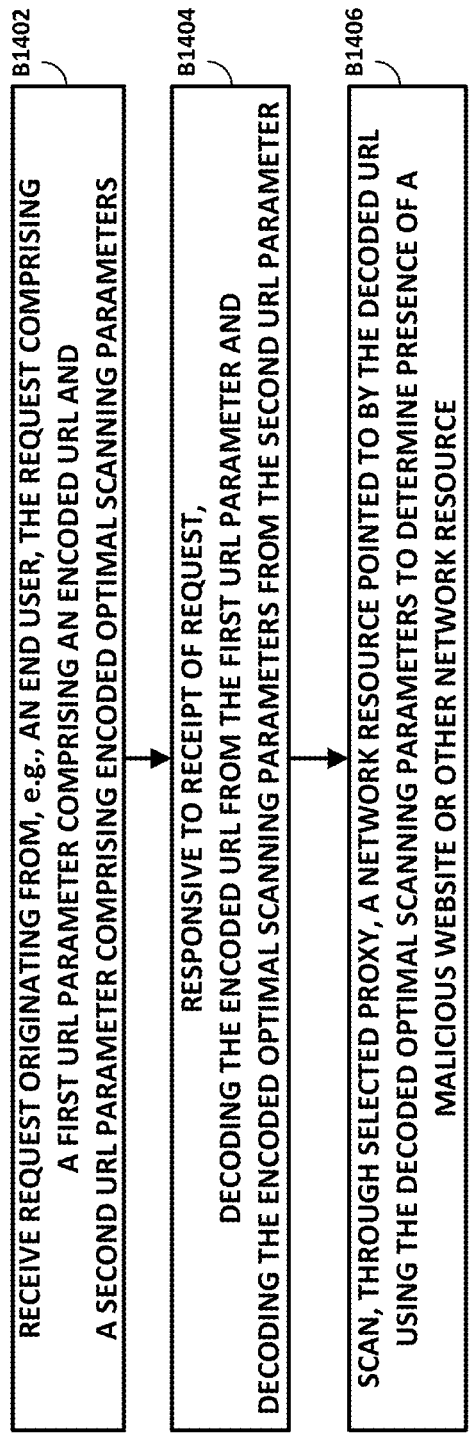
FIG. 14 is a flowchart of a computer-implemented method according to a still further embodiment.

FIG. 14 is a flowchart of a computer-implemented method according to one embodiment. The flowchart of FIG. 14 is from the point of view of the URL scanning service. As shown therein, the URL scanning service receives, at B1402, a request originating from, for example, an end user. The request comprises a first URL parameter comprising an encoded URL and a second URL parameter comprising one or more encoded optimal scanning parameters. Responsive to this request, the encoded URL from the first URL parameter may be decoded, as may be the encoded optimal scanning parameters from the second URL parameters. For example, the first and second URL parameters may have been encoded as Base64 strings, although other encodings may be utilized, as those of skill in this art may recognize. Now that the URL scanning service has the decoded URL of the suspicious HTTP server and is armed with the decoded optimal scanning parameters, it may scan the malicious website or other network resource using the optimal scanning parameters, as shown at B1406. In one embodiment, such scanning may be carried out through a proxy geolocated in a selected country, such that the scanned HTTP server is less likely to issue a defensive action.

Scanning and requesting data from the website(s) pointed to by the decoded URL(s) may comprise performing a respective HTTP GET request on the website pointed to by each of the decoded URLs, using the optimal scanning parameters. The URL scanning service may then determine whether the scanned server is legitimate or is likely a phishing kit HTTP server. For example, data may be requested from the website(s) pointed to by the decoded URL(s) and this requested data may be analyzed to determine whether a defensive action is returned therefrom.

FIG. 15 illustrates a block diagram of a computing device such as client computing device, email (electronic message) server, with which embodiments may be implemented. The computing device of FIG. 15 may include a bus 1501 or other communication mechanism for communicating information, and one or more processors 1502 coupled with bus 1501 for processing information. The computing device may further comprise a random-access memory (RAM) or other dynamic storage device 1504 (referred to as main memory), coupled to bus 1501 for storing information and instructions to be executed by processor(s) 1502. Main memory (tangible and non-transitory, which terms, herein, exclude signals per se and waveforms) 1504 also may be used for storing temporary variables or other intermediate information during execution of instructions by processor 1502. The computing device of FIG. 15 may also include a read only memory (ROM) and/or other static storage device 1506 coupled to bus 1501 for storing static information and instructions for processor(s) 1502. A data storage device 1507, such as a magnetic disk and/or solid-state data storage device may be coupled to bus 1501 for storing information and instructions—such as would be required to carry out some or all of the functionality shown and disclosed relative to FIGS. 1-14. The computing device may also be coupled via the bus 1501 to a display device 1521 for displaying information to a computer user. An alphanumeric input device 1522, including alphanumeric and other keys, may be coupled to bus 1501 for communicating information and command selections to processor(s) 1502. Another type of user input device is cursor control 1523, such as a mouse, a trackball, or cursor direction keys for communicating direction information and command selections to processor(s) 1502 and for controlling cursor movement on display 1521. The computing device of FIG. 15 may be coupled, via a communication interface (e.g., modem, network interface card or NIC) 1508 to the network 1526.

As shown, the storage device 1507 may include direct access data storage devices such as magnetic disks 1530, non-volatile semiconductor memories (EEPROM, Flash, etc.) 1532, a hybrid data storage device comprising both magnetic disks and non-volatile semiconductor memories, as suggested at 1531. References 1504, 1506 and 1507 are examples of tangible, non-transitory computer-readable media having data stored thereon representing sequences of instructions which, when executed by one or more computing devices, implement the optimal scanning parameter methods described and shown herein. Some of these instructions may be stored locally in a client computing device, while others of these instructions may be stored (and/or executed) remotely and communicated to the client computing over the network 1526. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 1528. For example, reference 1528 may be implemented as an optical (or some other storage technology) disk, which may constitute a suitable data carrier to load the instructions stored thereon onto one or more computing devices, thereby reconfiguring the computing device(s) to one or more of the embodiments described and shown herein. In other implementations, reference 1528 may be embodied as an encrypted solid-state drive. Other implementations are possible.

Embodiments of the present invention are related to the use of computing devices to implement novel scanning of HTTP servers hosting phishing kits through the selection of optimal scanning parameters. Embodiments provide specific improvements to the functioning of computer systems by defeating mechanisms implemented by cybercriminals to detect and defeat URL scanning technologies. Using such improved computer system, URL scanning technologies may remain effective to protect end-users by detecting and blocking cyberthreats. According to one embodiment, the methods, devices and systems described herein may be provided by one or more computing devices in response to processor(s) 1502 executing sequences of instructions, embodying aspects of the computer-implemented methods shown and described herein, contained in memory 1504. Such instructions may be read into memory 1504 from another computer-readable medium, such as data storage device 1507 or another (optical, magnetic, etc.) data carrier, such as shown at 1528. Execution of the sequences of instructions contained in memory 1504 causes processor(s) 1502 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor or integrated with the microprocessor. In another embodiment, the instructions may be stored on a disk and read into a volatile semiconductor memory before execution by the microprocessor.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process, such as the computer-implemented selection of optimal scanning parameters methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method of impersonating an intended victim of a phishing website, comprising:
   receiving, over a computer network, a modified version of an original electronic message, the modified version of the original electronic message having been previously received by the intended victim and comprising a modified Uniform Resource Locator (URL) that is a modified version of an original URL of the phishing website contained in the original electronic message, the modified URL comprising an encoded version of the original URL and encoded optimal scanning parameters;
   generating a request to a URL scanning service, the request comprising the encoded version of the original URL and the encoded optimal scanning parameters;
   sending the generated request to the URL scanning service and causing the URL scanning service, responsive to receiving the sent request, to:
      decode the encoded version of the original URL and decode the encoded optimal scanning parameters; and
      impersonate the intended victim of the phishing website by scanning the decoded original URL using the decoded optimal scanning parameters, such that the scanned phishing website does not generate a defensive action responsive to the scan.

2. The computer-implemented method of claim 1, wherein the modified URL further comprises a base URL of the URL scanning service.

3. The computer-implemented method of claim 1, wherein the modified URL further comprises:
   a base URL of the URL scanning service;
   a first URL parameter comprising an encoded version of the original URL, and
   a second URL parameter comprising encoded optimal scanning parameters.

4. The computer-implemented method of claim 1, wherein the URL scanning service decodes the encoded version of the original URL and the encoded optimal scanning parameters and impersonates the intended victim of the phishing website responsive to receiving an input indicative of a user having clicked on the modified URL.

5. The computer-implemented method of claim 1, wherein scanning the decoded original URL using the decoded optimal scanning parameters is carried out through a selected proxy.

6. The computer-implemented method of claim 1, further comprising obtaining further features from the received original electronic message, the further features comprising at least one of:
   analyzed content of text of the electronic message;
   information received by querying the Domain Name System (DNS);
   information received by querying WHOIS;
   information received by accessing and querying an IP address geolocation database;
   a main language used in the received original electronic message; and
   a graphic or other brand identifier, and
   wherein impersonating the intended victim of the phishing website by scanning the decoded original URL utilizes at least one of the further features.

7. The computer-implemented method of claim 1, wherein scanning further comprises following a redirection after having accessed the decoded original URL.

8. A computing device comprising:
   at least one processor;
   at least one data storage device coupled to the at least one processor;
   a network interface coupled to the at least one processor and to a computer network;
   a plurality of processes spawned by the at least one processor, the processes including processing logic for:
      receiving, over a computer network, a modified version of an original electronic message, the modified version of an original electronic message having been previously received by an intended victim of a phishing website and comprising a modified Uniform Resource Locator (URL) that is a modified version of an original URL of the phishing website contained in the original electronic message, the modified URL comprising an encoded version of the original URL and encoded optimal scanning parameters;

generating a request to a URL scanning service, the request comprising the encoded version of the original URL and the encoded optimal scanning parameters;

sending the generated request to the URL scanning service and causing the URL scanning service, responsive to receiving the sent request, to:

decode the encoded version of the original URL and decode the encoded optimal scanning parameters; and impersonate the intended victim of the phishing website by scanning the decoded original URL using the decoded optimal scanning parameters, such that the scanned phishing website does not generate defensive actions responsive to the scan.

9. The computing device of claim 8, wherein the modified URL further comprises a base URL of the URL scanning service.

10. The computing device of claim 8, wherein the modified URL further comprises:
a base URL of the URL scanning service;
a first URL parameter comprising an encoded version of the original URL, and
a second URL parameter comprising encoded optimal scanning parameters.

11. The computing device of claim 8, wherein the URL scanning service decodes the encoded version of the original URL and the encoded optimal scanning parameters and impersonates the intended victim of the phishing website responsive to receiving an input indicative of a user having clicked on the modified URL.

12. The computing device of claim 8, wherein the processing logic for scanning the decoded original URL using the decoded optimal scanning parameters includes processing logic for scanning the decoded original URL through a selected proxy.

13. The computing device of claim 8, further comprising processing logic for obtaining further features from the received original electronic message, the further features comprising at least one of:
analyzed content of text of the electronic message;
information received by querying the Domain Name System (DNS);
information received by querying WHOIS;
information received by accessing and querying an IP address geolocation database;
a main language used in the received original electronic message; and
a graphic or other brand identifier, and
wherein the processing logic for impersonating the intended victim of the phishing website further comprises processing logic for utilizing at least one of the further features when scanning the decoded original URL.

14. The computing device of claim 8, wherein the processing logic for scanning further comprises processing logic for following a redirection after having accessed the decoded original URL.

15. A computing device comprising:
at least one processor;
at least one data storage device coupled to the at least one processor;
a network interface coupled to the at least one processor and to a computer network;
a plurality of processes spawned by the at least one processor, the processes including processing logic for:
receiving, in a computing device comprising a processor and memory, an original electronic message comprising a suspicious URL;
storing the received original electronic message in the memory;
extracting features from the stored original electronic message;
using a function constructed to select optimal scanning parameters from the features extracted from the stored original electronic message and storing the selected optimal scanning parameters in the memory;
replacing the received original electronic message with a modified electronic message comprising a modified URL that replaces the suspicious URL in the received original electronic message with a rewritten URL that is configured to generate, when clicked, a request over the computer network to a URL scanning service to scan the suspicious URL using the optimal scanning parameters, the selected optimal scanning parameters being configured to enable the URL scanning service to appear to be an intended victim of the website pointed to by the suspicious URL and are configured such that the website pointed to by the suspicious URL does not generate defensive actions responsive to the scan; and
sending the modified electronic message with the replaced URL to a mailbox of an end-user.

16. The computing device of claim 15, wherein the processing logic for replacing comprises processing logic for rewriting the suspicious URL to include:
a base URL of the URL scanning service;
a first URL parameter comprising an encoded version of the suspicious URL; and
a second URL parameter comprising an encoded version of the stored optimal scanning parameters.

17. The computing device of claim 15, wherein the function is trained to select optimal scanning parameters from features extracted from electronic messages by:
collecting and storing a plurality of electronic messages, each comprising at least one suspicious URL that is potentially associated with a phishing kit;
extracting a set of features from each of the plurality of electronic messages;
providing, from the extracted sets of features, a set of desired optimal scanning parameters determined by programmatically or manually examining a source code of the corresponding phishing kit; and
training the function, using a supervised learning algorithm and the set of desired optimal scanning parameters, to select the optimal scanning parameters from the features extracted from electronic messages.

18. The computing device of claim 15, wherein the function is trained to select optimal scanning parameters from features extracted from electronic messages by:
collecting and storing a plurality of electronic messages, each of the plurality of electronic messages comprising a suspicious URL that is potentially associated with a phishing kit;

training, using a supervised learning algorithm, a function that determines optimal scanning parameters for each of the plurality of electronic messages by:

extracting, using the processor, a set of features from the electronic message; and selecting optimal scanning parameters by iteratively performing, through a plurality of HTTP proxies and with a plurality of HTTP headers, HTTP GET requests on the website pointed to by the suspicious URL until the website does not return a predetermined HTTP status code or does not redirect to a predetermined URL domain, and storing in the memory those HTTP scanning parameters that caused the website to not return a predetermined HTTP status code or to not redirect to a predetermined URL domain as the optimal scanning parameters.

19. The computing device of claim 15, wherein the extracted features comprise at least one of a country code top level domain of a recipient of the received original electronic message and a main language of the received original electronic message.

20. The computing device of claim 15, wherein the extracted features comprise at least one of a brand logo and a trademark in the received original electronic message.

21. The computing device of claim 15, further comprising processing logic for supplementing the features extracted from the received original electronic message with further features computed from the extracted features by at least one of:

analyzing content of text of the electronic message;

querying the Domain Name System (DNS);

querying WHOIS;

accessing and querying an IP address geolocation database;

applying Natural Language Processing to identify a main language used in the received original electronic message; and applying a feature-detection computer vision algorithm to recognize and to extract a trademarked graphic or other brand identifier that are rendered as images in the received original electronic message.

* * * * *